(12) United States Patent
Kowalski

(10) Patent No.: US 8,382,132 B2
(45) Date of Patent: Feb. 26, 2013

(54) MODULAR RUNNING BOARD

(75) Inventor: Steven M. Kowalski, Royal Oak, MI (US)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 13/317,272

(22) Filed: Oct. 13, 2011

(65) Prior Publication Data

US 2012/0091682 A1 Apr. 19, 2012

Related U.S. Application Data

(60) Provisional application No. 61/455,167, filed on Oct. 15, 2010.

(51) Int. Cl.
*B60R 3/00* (2006.01)
(52) U.S. Cl. ....................................................... 280/163
(58) Field of Classification Search .................. 280/163, 280/164.1, 166, 169, 291, 762; 296/163, 296/1.07, 151, 203.01, 209; 182/127, 64.1; 152/215
See application file for complete search history.

(56) References Cited

U.S. PATENT DOCUMENTS

| | | | | | |
|---|---|---|---|---|---|
| 4,935,638 | A * | 6/1990 | Straka | ................ | 280/164.1 |
| 4,943,085 | A * | 7/1990 | Straka | ................ | 280/770 |
| 5,193,829 | A * | 3/1993 | Holloway et al. | ................ | 280/163 |
| 5,697,626 | A * | 12/1997 | McDaniel et al. | ................ | 280/166 |
| 6,726,230 | B2 * | 4/2004 | Weir | ................ | 280/163 |
| 7,131,655 | B2 * | 11/2006 | Schumacher | ................ | 280/163 |
| 7,287,770 | B2 * | 10/2007 | Drabant et al. | ................ | 280/163 |
| 7,413,205 | B2 * | 8/2008 | Watson | ................ | 280/166 |
| 7,461,852 | B2 * | 12/2008 | Richardson et al. | ................ | 280/163 |
| 7,607,674 | B2 * | 10/2009 | Watson | ................ | 280/166 |
| 7,909,344 | B1 * | 3/2011 | Bundy | ................ | 280/163 |
| 2003/0178805 | A1 * | 9/2003 | Elrod | ................ | 280/163 |
| 2003/0222423 | A1 * | 12/2003 | Weir | ................ | 280/163 |
| 2004/0004339 | A1 * | 1/2004 | Fichter | ................ | 280/164.1 |
| 2005/0012295 | A1 * | 1/2005 | Chevalier et al. | ................ | 280/163 |
| 2005/0062252 | A1 * | 3/2005 | Vincent | ................ | 280/163 |
| 2005/0087950 | A1 * | 4/2005 | Draper et al. | ................ | 280/163 |
| 2005/0127635 | A1 * | 6/2005 | Fichter | ................ | 280/163 |
| 2006/0001229 | A1 * | 1/2006 | Kayne | ................ | 280/163 |
| 2006/0249924 | A1 * | 11/2006 | Armstrong et al. | ................ | 280/163 |
| 2007/0138757 | A1 * | 6/2007 | Kuntze et al. | ................ | 280/163 |
| 2008/0231013 | A1 * | 9/2008 | Richardson et al. | ................ | 280/163 |
| 2008/0246244 | A1 * | 10/2008 | Watson | ................ | 280/166 |
| 2008/0303238 | A1 * | 12/2008 | Fichter | ................ | 280/163 |
| 2009/0184485 | A1 * | 7/2009 | Castillo et al. | ................ | 280/164.1 |
| 2009/0267374 | A1 * | 10/2009 | Mulder | ................ | 296/37.1 |
| 2009/0294497 | A1 * | 12/2009 | Todorovic | ................ | 224/402 |
| 2012/0091682 | A1 * | 4/2012 | Kowalski | ................ | 280/163 |

* cited by examiner

*Primary Examiner* — Katy M Ebner
*Assistant Examiner* — Brodie Follman
(74) *Attorney, Agent, or Firm* — Warn Partners, P.C.

(57) ABSTRACT

A modular running board adaptable for use with various types of vehicles having different wheel bases. In a first embodiment, the running board includes a first long board and a second long board connectable to a pick-up truck having crew cab or quad cab with four full doors. In another embodiment, the first long board is connected to a short board, and both the long board and short board are connected to a pick-up truck having an extended cab, with two full doors and two half-doors. In either of the first two embodiments, a coupling piece is used for connecting the first long board to the second long board, or the first long board to the short board. In yet another embodiment, only the first long board is connected to a vehicle, such as a pickup truck having a regular cab with two full doors only.

2 Claims, 4 Drawing Sheets

MODULAR RUNNING BOARD

CROSS-REFERENCE TO RELATED APPLICATIONS

This application claims priority to U.S. Provisional Application No. 61/455,167 filed on Oct. 15, 2010. The disclosure of the above application is incorporated herein by reference.

FIELD OF THE INVENTION

The present invention relates to a modular running board suitable for vehicles having different wheel bases.

BACKGROUND OF THE INVENTION

Running boards for vehicles are generally known, and are a popular accessory to attach to a vehicle because running boards both have functionality and can enhance the aesthetic appearance of a vehicle. Many types of running boards are designed specifically for trucks and sport-utility vehicles because these types of vehicles have a higher ride height compared to a car. However, the length of the wheel base for trucks and sport utility vehicles may vary. Trucks are manufactured with two conventional doors (commonly referred to as a "regular cab" design), two conventional doors and two second row half-doors (commonly referred to as an "extended cab" design), and four conventional doors (commonly referred to as a "quad cab" or "crew cab" design).

Vehicles having wheel bases of different lengths require running boards of different lengths to allow passengers entering and exiting the vehicle through the various doors to use the running boards. However, most conventional running boards having a tubular or flat shape are manufactured to be suitable for one particular wheel base.

Accordingly, there exists a need for a running board which is suitable for use with different vehicles having wheel bases of different lengths.

SUMMARY OF THE INVENTION

The present invention is directed to a modular running board adaptable for use with various types of vehicles having different wheel bases. In a first embodiment of the present invention, the running board includes a first long board and a second long board connectable to a pick-up truck having crew cab or quad cab with four full doors.

In another embodiment of the invention the first long board is connected to a short board, and both the long board and short board are connected to a pick-up truck having an extended cab, with two full doors and two half-doors. In either of the first two embodiments, a coupling piece is used for connecting the first long board to the second long board, or the first long board to the short board.

In yet another embodiment of the invention, only the first long board is connected to a vehicle, such as a pickup truck having a regular cab with two full doors only.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
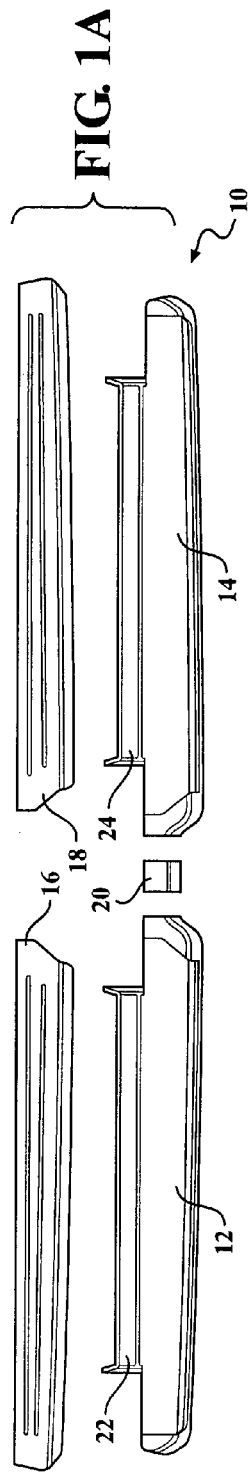
FIG. 1A is an exploded view of a running board, according to a first embodiment of the present invention.
Figure 1B:
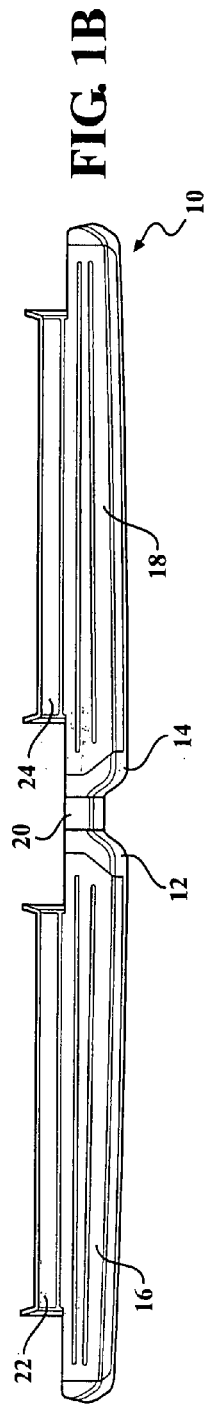
FIG. 1B is a side view of a running board, according to a first embodiment of the present invention.
Figure 2A:
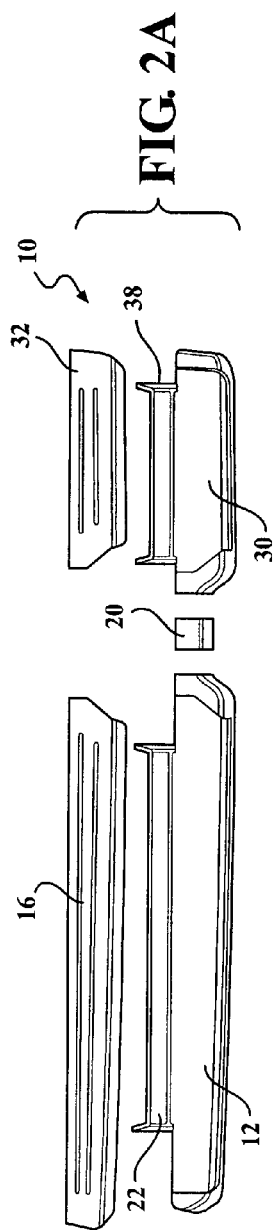
FIG. 2A is an exploded view of a running board, according to a second embodiment of the present invention.
Figure 2B:
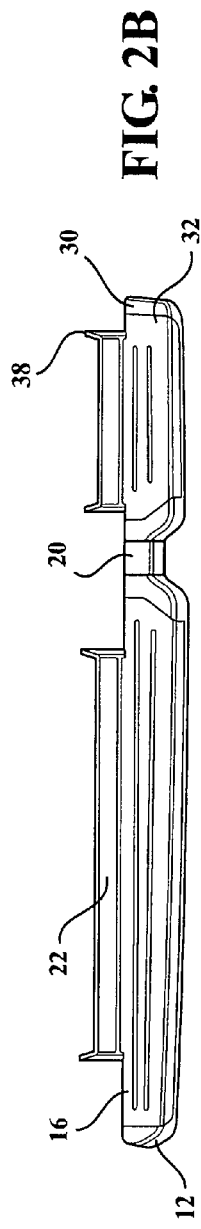
FIG. 2B is a side view of a running board, according to a second embodiment of the present invention.
Figure 3A:
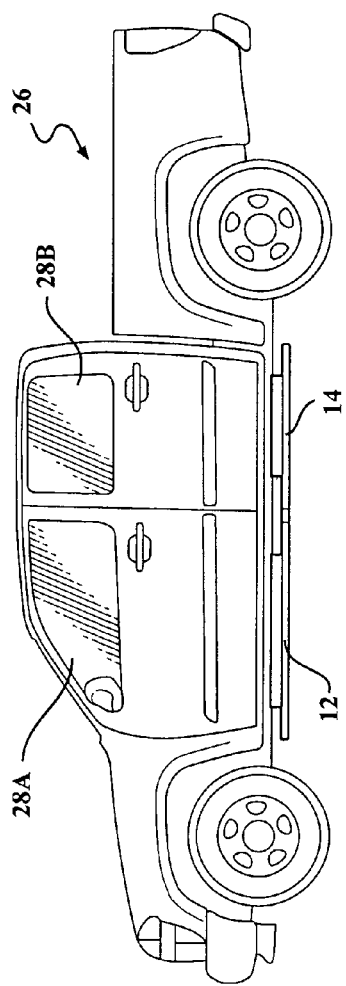
FIG. 3A is a side view of a vehicle having a running board, according to a first embodiment of the present invention.
Figure 3B:
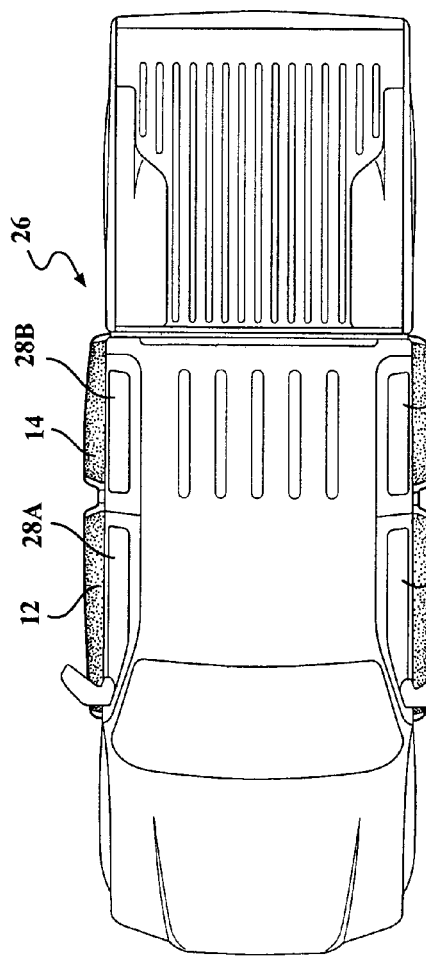
FIG. 3B is a top view of a vehicle having a running board, according to a first embodiment of the present invention.
Figure 3C:
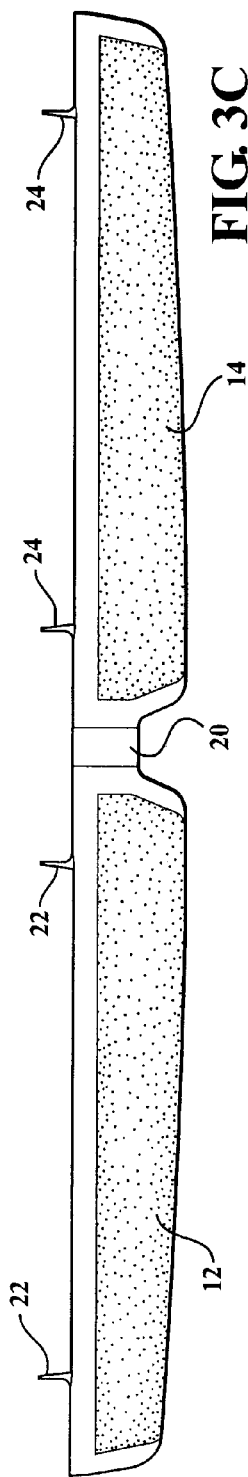
FIG. 3C is a top view of a running board with the modular step features removed, according to a first embodiment of the present invention.

The following description of the preferred embodiment(s) is merely exemplary in nature and is in no way intended to limit the invention, its application, or uses.

Referring to FIGS. 1A-1B and FIGS. 3A-3C, a running board according to a first embodiment of the present invention is shown generally at 10. The running board 10 includes a first board, which in this embodiment is a first long board 12, and a second board, which in this embodiment is a second long board 14. A first modular step 16 is selectively connected to the first long board 12, and a second modular step 18 is selectively connected to the second long board 14. The modular steps 16, 18 provide a stepping surface for the long boards 12, 14 which may be stepped on when entering and exiting a vehicle. When assembled, the long boards 12, 14 are selectively connected together through the use of a coupling piece 20.

Formed as part of the first long board 12 is a first flange 22, and formed as part of the second long board 14 is a second flange 24. The flanges 22, 24 are used for providing a connection between the running board 10 and a vehicle, such as the vehicle, shown generally at 26. The first embodiment of the running board 10 of the present invention is suitable for a vehicle 26 having four doors 28. More particularly, when assembled to the vehicle 26, the first long board 12 is connected to the vehicle 26 such that the first long board 12 is used with one of the doors 28A, and the second long board 14 is used with one of the other doors 28B. Both long boards 12, 14 are connected to the vehicle 26 through the use of the respective flanges 22, 24. In this embodiment, the flanges 22, 24 are connected to the frame of the vehicle 26, but it is within the scope of the invention that the flanges 22, 24 may be connected to other parts of the vehicle 26 as well.

The modular steps 16, 18 are detachable from the respective long boards 12, 14, and may be equipped with gripping surfaces if desired to reduce the chance of a passenger slipping on the running board 10 when entering and exiting the vehicle.

Figure 4A:
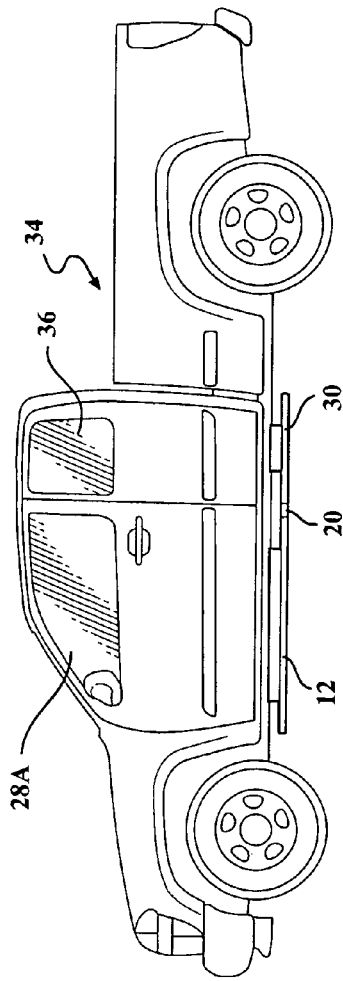
FIG. 4A is a side view of a vehicle having a running board, according to a second embodiment of the present invention.
Figure 4B:
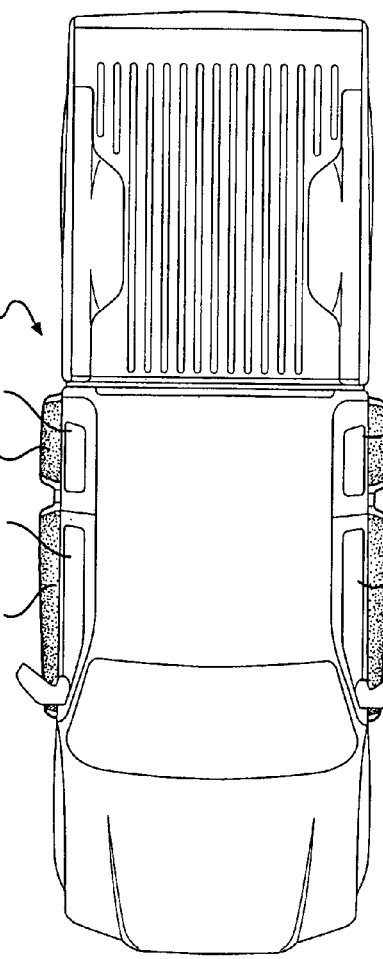
FIG. 4B is a top view of a vehicle having a running board, according to a second embodiment of the present invention.
Figure 4C:
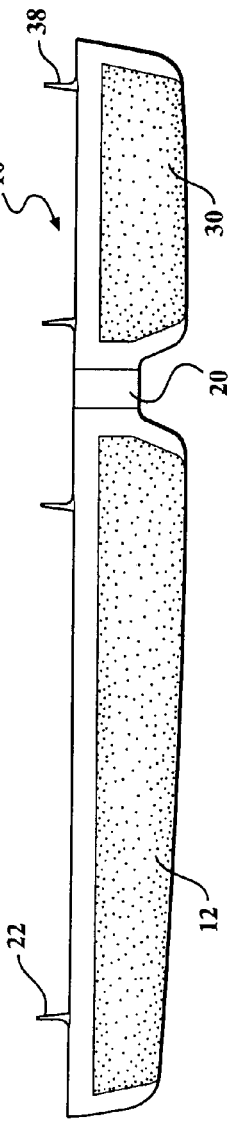
FIG. 4C is a top view of a running board with the modular step features removed, according to a second embodiment of the present invention.

Referring to FIGS. 2A-2B and 4A-4C, another embodiment of the running board 10 according to the present invention is shown, with like numbers referring to like elements. In this embodiment, the second board is a short board 30 which is suitable for connection with the first long board 12 with the same coupling piece 20 as mentioned in the first embodiment. The short board 30 also includes a second modular step in the form of a short modular step 32; both the short board 30 and short modular step 32 are similar to the second long board 14 and the second modular step 18, with the exception that the short board 30 and short modular step 32 are shorter in length. The first long board 12 and the first modular step 16 are connected to a vehicle 34 having two doors 28 similar to the doors 28A of the vehicle 26 shown in FIGS. 3A and 3C, but the vehicle 34 shown in FIGS. 4A and 4B has two second row "half-doors" 36, and is referred to as having an extended cab. The short board 30 is suitable for connection with the vehicle 34 in proximity to the half-door 36, and there is a short board 30 on each side of the vehicle 34 as shown in FIGS. 4A and 4B.

The short modular step 32 is also selectively connectable to the short board 30 in a similar manner to the modular steps 16, 18 and the long boards 12, 14 of the first embodiment. The short board 30 also has short flanges 38 which are used for connecting the short board 30 to the vehicle 34.

Figure 5A:
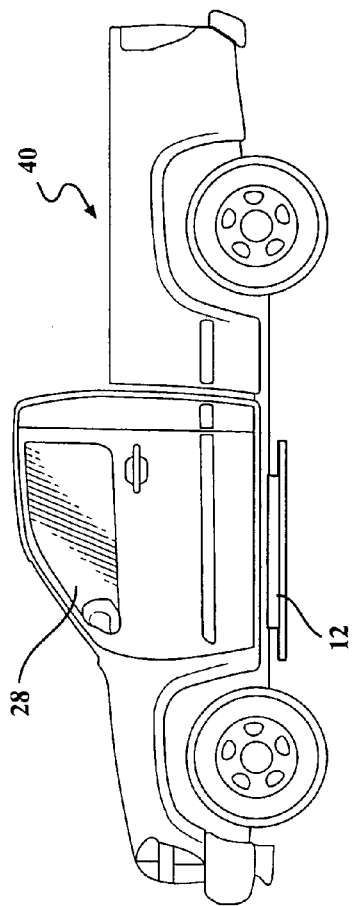
FIG. 5A is a side view of a vehicle having a running board, according to a third embodiment of the present invention.
Figure 5B:
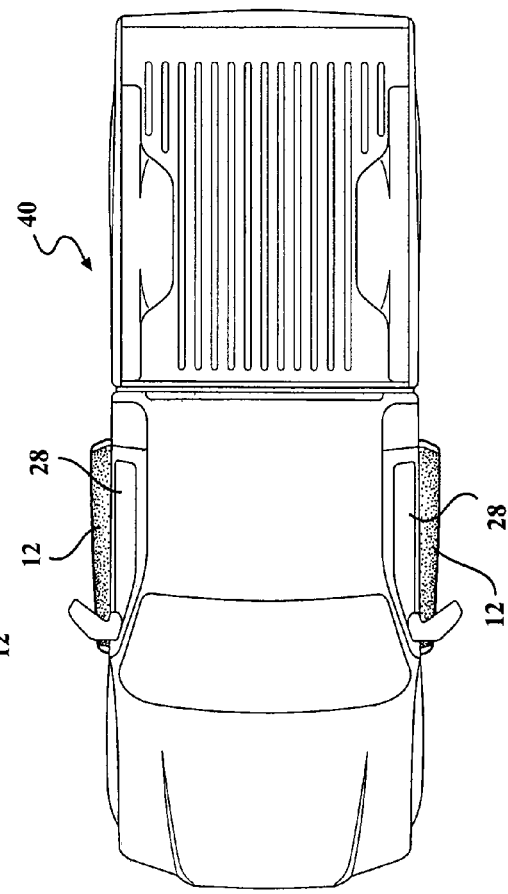
FIG. 5B is a top view of a vehicle having a running board, according to a third embodiment of the present invention.
Figure 5C:
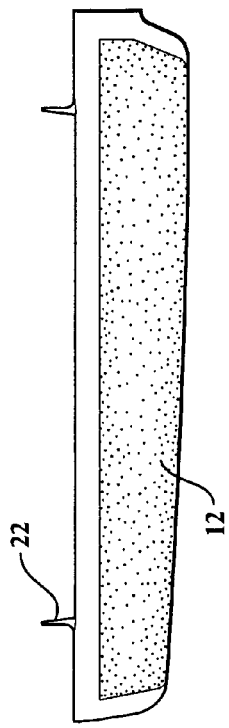
FIG. 5C is a top view of a running board with the modular step feature removed, according to a third embodiment of the present invention.

A third embodiment of the present invention is shown in FIGS. 5A-5C, with like numbers referring to like elements. In this embodiment, the first long board 12 is connected to a vehicle 40 having only two doors 28; more specifically, the vehicle 40 is a "regular cab" pickup truck. Again, the flange 22 is used to connect the first long board 12 to the vehicle 40 in a similar manner as compared to the first two embodiments.

The modular running board 10 of the present invention allows for a single type of running board system to have interchangeable connecting parts for use with different vehicles having different wheel bases. The first long board 12 may be connected to the second long board 14 or the short board 30 using the same coupling piece 20. The first long board 12 is then usable with either the second long board 14 or the short board 30 to provide a running board for a vehicle with different wheelbase lengths. Furthermore, the first long board 12 may be used independently for attachment to a vehicle to provide a stepping surface for entering and exiting a vehicle.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A modular running board assembly system connected to a vehicle having one or more doors, comprising:
    said modular running board assembly having interchangeable connecting parts for use with different vehicles having different wheel bases;
    a first long board of said interchangeable connecting parts;
    a first flange integrally formed as part of said first long board, said first flange connects said first long board to a vehicle in proximity to a first door;
    a second long board of said interchangeable connecting parts;
    a second flange integrally formed with said second long board, said second flange connecting said second long board to said vehicle in proximity to a second door;
    a short board of said interchangeable connecting parts,;
    a short flange formed as part of said short board;
    a coupling piece operable for connecting and interchanging said first long board with one of said second long board and said short board; and
    wherein said first long board and one of said second long board or said short board facilitate the entry and exit of said vehicle.

2. The modular running board assembly system of claim 1 further comprising:
    a first modular step connected to said first long board for providing a stepping surface;
    a second modular step connected to said second long board for providing a stepping surface; and
    a short modular step connected to said short board for providing a stepping surface.

* * * * *